Nov. 6, 1951 G. J. KIRCHNER 2,573,848
PIPE TRANSFER APPARATUS
Filed June 16, 1950 3 Sheets-Sheet 1

Inventor:
GEORGE J. KIRCHNER,
by: Donald G. Dalton
his Attorney.

Nov. 6, 1951 G. J. KIRCHNER 2,573,848
PIPE TRANSFER APPARATUS
Filed June 16, 1950 3 Sheets-Sheet 2

Inventor:
GEORGE J. KIRCHNER,
by: Donald G. Dalton
his Attorney.

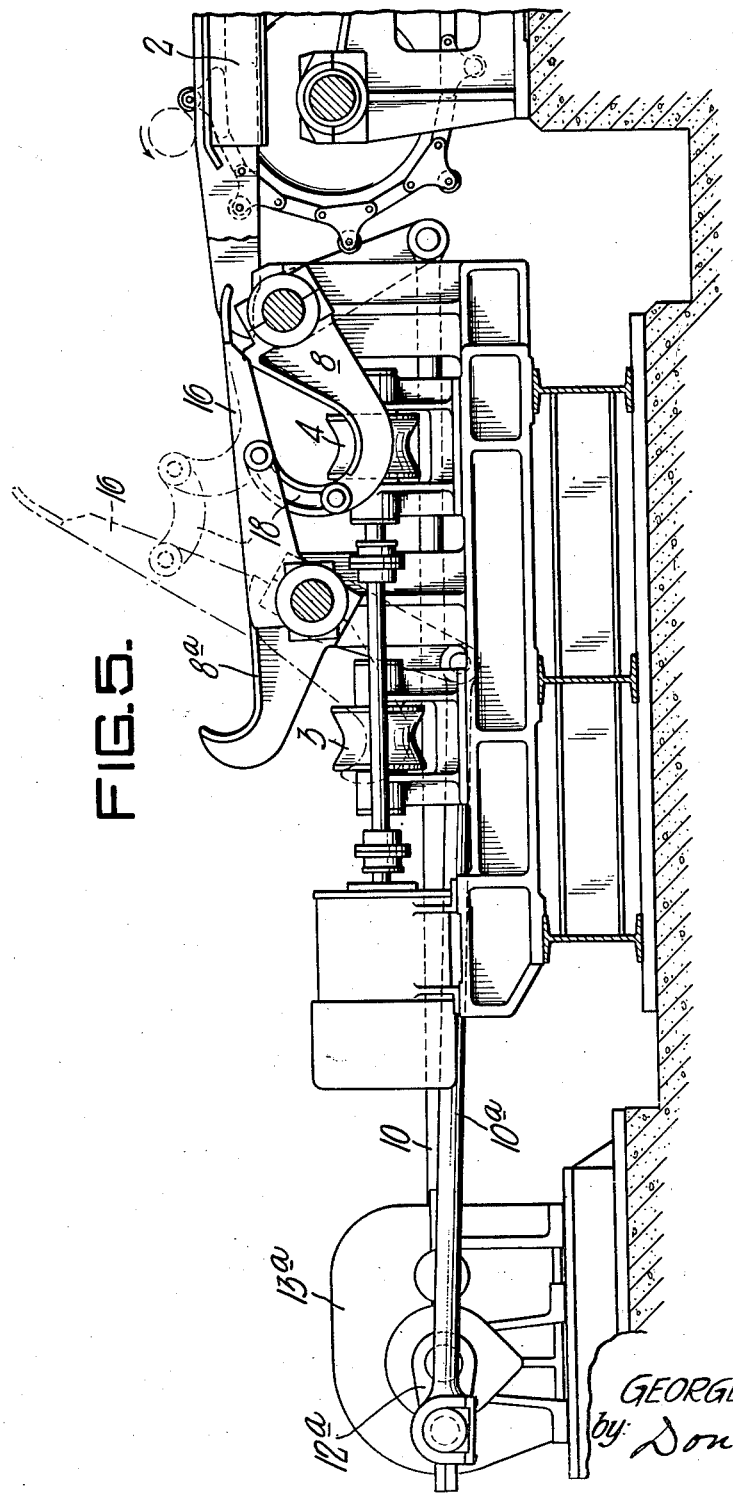

Patented Nov. 6, 1951

2,573,848

UNITED STATES PATENT OFFICE 2,573,848

PIPE TRANSFER APPARATUS

George J. Kirchner, Lorain, Ohio, assignor to National Tube Company, a corporation of New Jersey Application June 16, 1950, Serial No. 168,476

6 Claims. (Cl. 198—31)

This invention relates to a pipe conveying apparatus and in particular to apparatus for transferring pipe between a pair of longitudinal conveyors and a transverse conveyor.

In the manufacture of pipe, tubing and the like certain of the sequential operations require more time than those immediately preceding or immediately subsequent thereto. It is advantageous therefore to provide duplicate equipment for conducting the slow operations. This is particularly important if a pipe mill susceptible of continuous operation is to be achieved.

Accordingly it is an object of the present invention to provide apparatus for transferring alternate pipes of a series of moving pipes to and from the individual conveyors of the "slow" processing units.

This and other objects will be made apparent in the following description when read in conjunction with the attached drawings wherein:

Figure 5 is a sectional view taken along the lines V—V of Figure 4.

Figure 1:
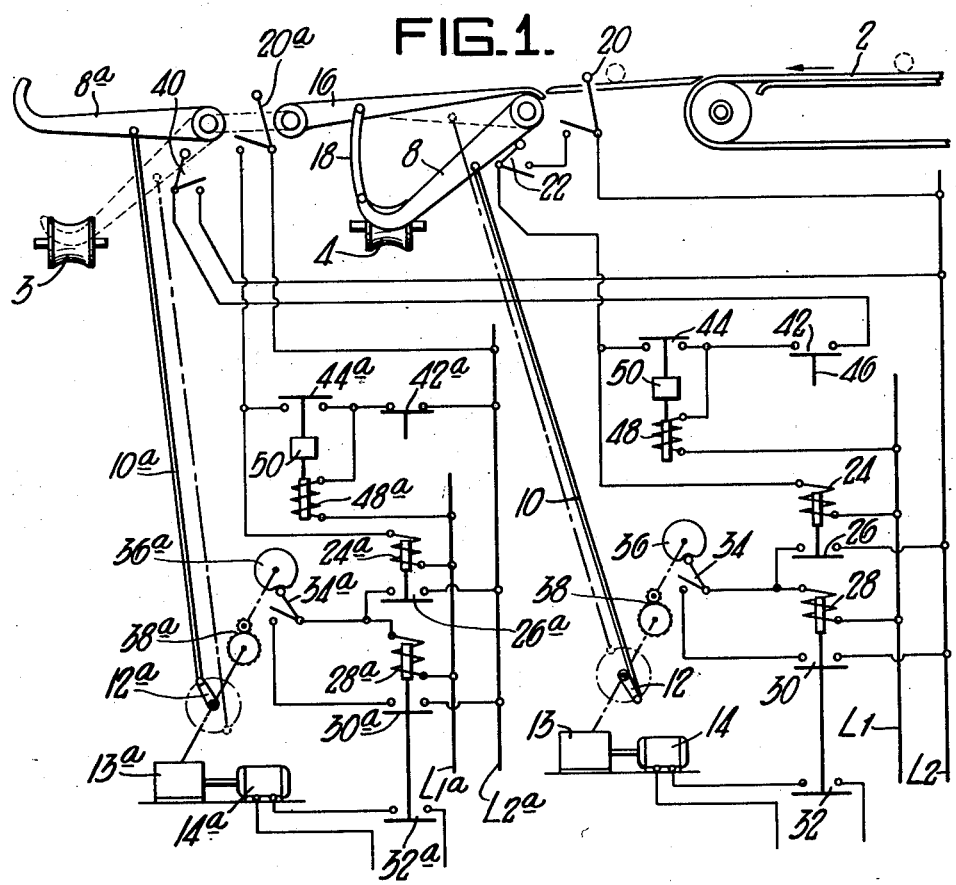
Figure 1 is a schematic arrangement of the apparatus of the present invention.

With particular reference to the drawings, a chain conveyor 2 is shown for receiving and transporting pipes transversely of their length from a longitudinal conveyor, not shown, to a pair of longitudinal conveyors 3 and 4. The conveyor 3 is located adjacent the end and at a lower elevation than the conveyor 2. Conveyor 3 serves to position pipe in a stripping apparatus indicated in general by reference numeral 5 and then to convey the pipe to some subsequent processing step, not shown. Conveyor 4 is arranged parallel to and in about the same horizontal plane as conveyor 3, and serves the same function with respect to a second stripping apparatus 6. A set of arms 8 are pivotally mounted at the discharge end of transverse conveyor 2. The free ends of these arms are suitably formed to cradle a pipe, and are connected through linkages 10 to cranks 12 driven through a reducer 13 by a motor 14, the arrangement being adapted to receive a pipe from conveyor 2 and lower the same to the conveyor 4. A similar set of arms 8a, pivotally mounted adjacent the ends of the arms 8 and operated by linkages 10a, cranks 12a, reducer 13a and motor 14a are provided to serve conveyor 3. Pivotally mounted, adjacent the pivotally mounted ends of arms 8a and conveniently from the same shaft supporting the arms 8a, is a set of cross-over members 16 for bridging the gap between arms 8a and conveyor 2 when the arms 8 are lowered. The members 16 are connected by linkages 18 to the free ends of the arms 8 so that they are raised and lowered with the raising and lowering of the arms 8.

The motor 14 for operating arms 8 is provided with control means which include a normally open limit switch 20 positioned near the end of conveyor 2 so as to be operable by pipe delivered from that conveyor. Switch 20 is connected in series with a normally closed limit switch 22 which is positioned to be opened by one of the arms 8 when the latter are in their lowered position. The switches 20 and 22 are connected across lines $L_1$ and $L_2$ through the operating coil of a relay 24. The latter has a pair of normally open contacts 26 which connect the operating coil of a relay 28 across $L_1$ and $L_2$. Relay 28 is provided with two sets of normally open contacts 30 and 32, the contacts 30 being connected in series with a normally open cam operated switch 34 and the operating coil of relay 28 across $L_1$ and $L_2$ to provide a sealing-in circuit for the relay 28. The contacts 32 are connected in circuit with and control the operation of the motor 14. Switch 34 is operated by a cam 36 driven from the cranks 12 through a 2:1 gear arrangement 38 so that a 180° turn of the cranks results in a 360° turn of the cam. Cam 36 is so shaped and positioned with respect to the position of cranks 12 that switch 34 is in its normally open position when arms 8 are in their fully raised or fully lowered positions and is held closed at all other times.

Switches 20 and 22 constitute a signal circuit for initiating lowering of the arms 8 from their raised positions. The inclusion of switch 22 renders closing of switch 20 ineffective when the arms 8 are in their lowered position.

Similar control means are provided for motor 14a and, for convenience, like parts have been given the same reference numeral with the subscript "a" added. The "lower" signal circuit of motor 14a differs from that of motor 14 in that there is no counterpart for switch 22, none being needed.

Figure 3:
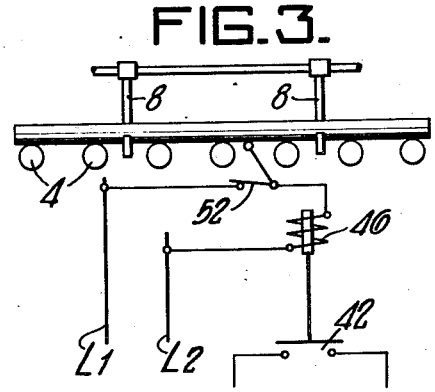
Figure 4:
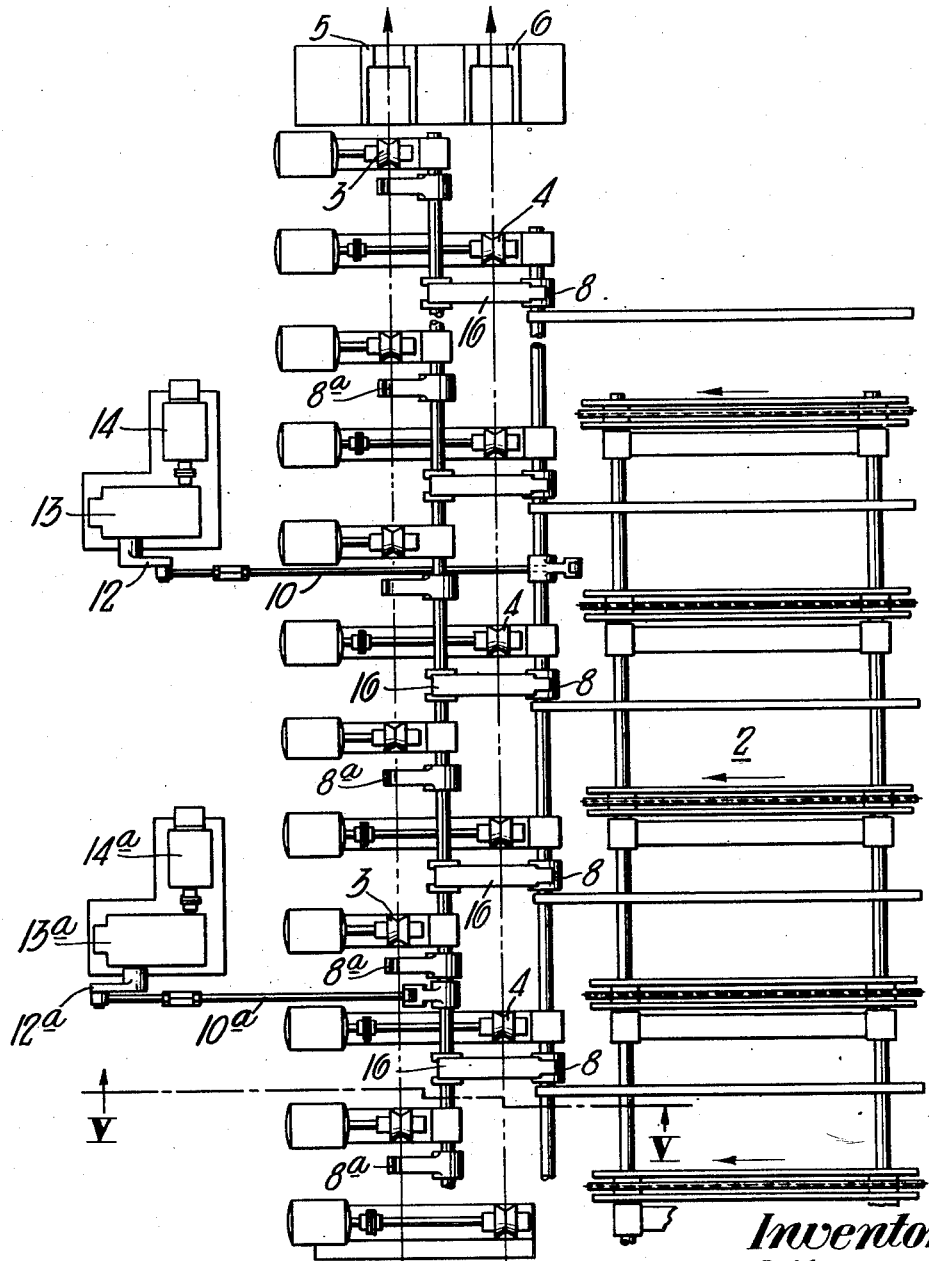
Figure 4 is a plan view showing mechanical details of the apparatus.

A "raise" signal circuit in parallel with the above mentioned "lower" signal circuit as respects relay 24 is provided to initiate raising of the arms 8. The "raise" circuit includes a normally open limit switch 40 positioned to be closed by one of the arms 8a when the latter is in their lowered position, a set of normally closed contacts 42 of a relay 46, a set of normally open contacts 44 of a time relay 48 and the operating coil of relay 24. The operating coil of time relay 48 is connected intermediate contacts 44 and 42 to the line $L_1$ so as to be energized by the closing of contacts 42. The relay 48 may be of the type which closes its contacts 44 upon energization of its operating coil and, through a timing mechanism 50, opens its contacts after a selected time interval has passed. As shown in Figure 3 the operating coil of relay 46 is powered from lines $L_1$ and $L_2$ through a normally open limit switch 52 located in conveyor 4 so as to be held closed by pipe resting on that conveyor.

Switch 40 functions to render the "raise" signal circuit inoperative unless the arms 8a are in their lowered position. This interlock is necessary to prevent arms 8 raising and raising cross-over arms 16 during the period that arms 8a are in their raised or receiving position.

A similar "raise" signal circuit is provided for motor 14a and again for convenience like parts have been given the same reference numeral with the subscript "a" added. The "raise" signal circuit of motor 14a differs from that of motor 14 in that there is no counterpart for switch 40, normally closed contact 42a of relay 46a being connected directly to line $L_{2a}$.

Figure 2:
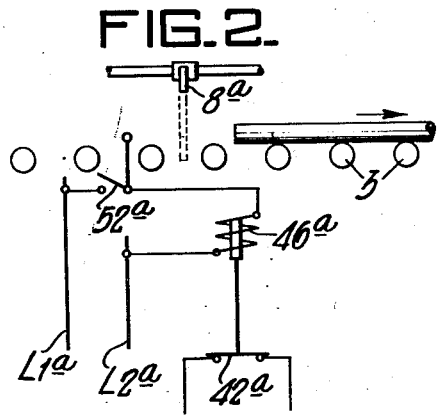
Figures 2 and 3 show details of Figure 1 which cannot be conveniently shown therein.

To illustrate operation of the apparatus, it may be assumed that the conditions shown in Figures 1, 2 and 3 exist, i. e., that arms 8a are in the raised position, thus limit switch 40 is open; that conveyor 3 is clear, thus switch 52a is open and relay 46a deenergized so that contacts 42a thereof are closed and time relay 48a energized but timed out so that its contacts 44a are open; that a pipe has been delivered to conveyor 4 and rests thereon, consequently limit switch 52 is closed, relay 46 energized and contacts 42 open; and that arms 8 are in their lowered position thus holding switch 22 open. Under these conditions when the next pipe is discharged from transverse conveyor 2 it will roll over switch 20 momentarily closing the same. This closing of switch 20 however will have no effect on motor 14 since switch 22 is being held open by the lowered arms 8. The pipe therefore will continue to roll across the cross-over arms 16 to the arms 8a and in doing so will close switch 20a. This momentary closing of switch 20a energizes relay 24a closing contacts 26a thereof to energize relay 28a causing contacts 30a and 32a thereof to close. Closing of the latter sets motor 14a in operation causing cranks 12a to move to lower the arms 8a. The initial movement of cranks 12a rotates cam 36a to close switch 34a and seal-in relay 28a. Motor 14a therefore continues to operate. As the cranks 12 are rotated a half revolution to lower arms 8a, the 2:1 gearing arrangement 38a rotates cam 36a through a full revolution and allows switch 34a to assume its normal open position which deenergizes relay 28a to stop motor 14a. As the pipe in arms 8a comes to rest on conveyor 3 it closes switch 52a energizing relay 46a and opening the contacts 42a thereof.

The lowering of arms 8a also closes switch 40 in the "raise" signal circuit of arms 8, thus as soon as the pipe on conveyor 4 is moved clear of switch 52 the latter will open and deenergize relay 46 allowing contacts 42 thereof to close and energize time relay 48 causing the latter to reset its timing mechanism 50 and close its contacts 44. Closing contacts 44 energizes relay 24 which in turn energizes relay 28 to complete the power circuit of motor 14 to initiate movement of cranks 12. The latter results in the closing of switch 34 by cam 36 which seals-in relay 28 until the cam makes a complete revolution which, by reason of the 2:1 gearing 38, coincides with a half revolution of the cranks 12. The time interval of time relay 48 is set so that the relay will time out and open its contacts 44 in less time than is required for the cam 36 to make a complete revolution. The movement of cranks 12 through 180° raises the arms 8 to their upper position and, through the linkage 18, moves cross-over arms 16 to their raised position.

Raising of arms 8 permits switch 22 to revert to its normally closed position, thus when the next pipe is discharged from transverse conveyor 2 and rolls onto the raised arms 8 it will momentarily close switch 20 initiating the lowering cycle of these arms which will result in cross-over arms 16 moving to their lowered position.

During the interval of operation of arms 8 operations on the pipe delivered to conveyor 3 will have been completed and the pipe moved clear of the conveyor. As this pipe leaves conveyor 3 switch 52a will open, deenergizing relay 46a and closing contacts 42a thereof. The latter action energizes time relay 48a causing it to reset and close its contacts 44a thereby energizing relay 25a which in turn energizes relay 28a to operate motor 14a. The sealing-in circuit then operates as previously described, motor 14a being stopped when cam 36a makes a full revolution. Upon the return of arms 8a to their raised position, the apparatus is in its original state and is ready to receive the next tube on arms 8a and repeat the foregoing cycle of operations.

Manually operated switches can be provided in the power circuits of motors 14 and 14a to permit the manual operation of the individual raising and lowering mechanisms in the event a defective tube is delivered to either of the conveyors which must be removed. It will be understood that the necessary switches in the power lines to the control circuits will be provided to render either of these circuits inactive during this time.

The invention has been described in connection with transferring alternate pipes in a series delivered from a transverse conveyor to a pair of longitudinal conveyors. It is obvious, however, that minor changes in the apparatus, e. g., relocating switches 52 and 52a at the opposite end of their respective conveyors and replacing the normally closed contacts 42 and 42a with normally open contacts, will permit the reverse of this procedure.

Accordingly while I have shown and described an embodiment of my invention, it will be apparent that modifications may be made without departing from the scope of the appended claims.

I claim:

1. In apparatus for transferring pipe and the like, a transverse conveyor; a first longitudinal conveyor located adjacent one end of and below said transverse conveyor; a second longitudinal conveyor disposed parallel to the first longitudinal conveyor and below said transverse conveyor; a transfer member pivotally mounted adjacent the end of said transverse conveyor for transferring a pipe between said transverse conveyor and said first longitudinal conveyor; the free end of said transfer member being formed to cradle a pipe; a second transfer member pivotally mounted adjacent the first transfer member adapted to transfer a pipe between said transverse conveyor and said second longitudinal conveyor; a cross-over member pivotally mounted adjacent the point of mounting of the second transfer member for bridging the gap between the end of the transverse conveyor and the pivotally mounted end of the second transfer member; means connecting the cross-over member to the first transfer member for vertical movement therewith; means for raising and lowering each transfer member, an electric motor for operating each of said last named means; and selectively operable means for energizing said electric motors to alternately raise and lower said transfer members.

2. In apparatus for transferring pipe and the like, a transverse conveyor; a first longitudinal conveyor located adjacent one end of and below said transverse conveyor; a second longitudinal conveyor disposed parallel to the first longitudinal conveyor and below said transverse conveyor; transfer member pivotally mounted adjacent the end of said transverse conveyor for transferring a pipe between said transverse conveyor and said first longitudinal conveyor; the free end of said transfer member being formed to cradle a pipe; a second transfer member pivotally mounted adjacent the first transfer member adapted to transfer a pipe between said transverse conveyor and said second longitudinal conveyor; a cross-over member pivotally mounted adjacent the point of mounting of the second transfer member for bridging the gap between the end of the transverse conveyor and the pivotally mounted end of the second transfer member; means connecting the cross-over member to the first transfer member for vertical movement therewith; means for raising and lowering each transfer member, an electric motor for operating each of said last named means; a control circuit for each of said motors, a switch adjacent the pivot end of each of said transfer members, the switch adjacent the first transfer member being in the control circuit of the associated motor and being operable by a pipe being transferred to complete the circuit to its associated motor when the first transfer member is in raised position, time delay means for keeping the first transfer member in lowered position, the switch adjacent the second transfer member being in the control circuit of the associated motor and being operable by a pipe being transferred to complete the circuit to its associated motor when the first transfer member is in lowered position and the second transfer member is in raised position and time delay means for keeping the second transfer member in lowered position.

3. In apparatus for transferring pipe and the like, a transverse conveyor; a first longitudinal conveyor located adjacent the end of said transverse conveyor; a second longitudinal conveyor disposed parallel to the first longitudinal conveyor; a first set of arms having ends pivotally mounted adjacent the end of said transverse conveyor and adapted to transfer a pipe between said transverse conveyor and said first longitudinal conveyor; a second set of pivotally mounted arms adapted to transfer a pipe between said transverse conveyor and said second longitudinal conveyor; a set of cross-over arms pivotally mounted adjacent the pivoted ends of the second set of arms for bridging the gap between the end of the transverse conveyor and the pivoted ends of the second set of arms; means connecting the first set of arms to the cross-over arms whereby the latter will be raised and lowered with the first set of arms; operating means for raising and lowering each set of arms, each of said means comprising cranks connected to said arms and an electric motor for driving said cranks; and control means for each of said motors, the control means for the motor for the first set of arms comprising a motor control relay; a first signal circuit for energizing said relay comprised of a first circuit-control device located adjacent the pivotally mounted ends of the first set of arms and operable by pipe being transferred, and a second circuit-control device in series with the first circuit-control device and operable by one of the first set of arms whereby the first circuit-control device is rendered ineffective when the first set of arms are in the lowered position; a second signal circuit in parallel with the first signal circuit and comprised of a time relay, a first circuit-control device operable by a pipe on the first longitudinal conveyor, and a second circuit-control device operable by one of the second set of arms whereby said first circuit-control device is rendered ineffective when said second set of arms are in the raised position; and sealing-in means for maintaining the motor control relay energized, said means including a cam operated circuit-control device, a cam and 2:1 gearing means for driving said cam from the cranks operated by the motor whereby said cam makes one full revolution for each half revolution of said cranks; the control means for the motor for the second set of transfer arms comprising a motor control relay; a first signal circuit for energizing said relay comprised of a circuit-control device located adjacent the pivotally mounted ends of the second set of arms and operable by pipe moving thereover; a second signal circuit in parallel with the first signal circuit including a time relay and a circuit-control device operable by a pipe on the second longitudinal conveyor; and sealing-in means for maintaining the motor control relay energized, said means including a cam operated circuit-control device, a cam and 2:1 gearing means for driving said cam from the cranks operated by the motor whereby said cam makes one full revolution for each half revolution of said cranks.

4. In apparatus for transferring pipe and the like, a transverse conveyor; a first longitudinal conveyor located adjacent the end of said transverse conveyor; a second longitudinal conveyor disposed parallel to the first longitudinal conveyor; a first set of arms having ends pivotally mounted adjacent the end of said transverse conveyor and adapted to transfer a pipe between said transverse conveyor and said first longitudinal conveyor; a second set of pivotally mounted arms adapted to transfer a pipe between said transverse conveyor and said second longitudinal conveyor; a set of cross-over arms pivotally mounted adjacent the pivoted ends of the second set of arms for bridging the gap between the end of the transverse conveyor and the pivoted ends of the second set of arms; means connecting the first set of arms to the cross-over arms whereby the latter will be raised and lowered with the first set of arms; operating means for raising and lowering each set of arms, each of said means comprising cranks connected to said arms and an electric motor for driving said cranks; and control means for each of said motors, the control means including a motor control relay having two sets of contacts, one set of said contacts being connected in circuit with the motors; sealing-in means for maintaining said control relay closed for a half revolution of the cranks driven by the motor it controls, said sealing-in means including a circuit comprising the second set of contacts of the control relay and a normally open cam-operated switch, a cam for operating said switch and a 2:1 gearing means for driving said cam from the cranks driven by the motor whereby said cam will make a full revolution for each half revolution of the cranks; a "lower" signal circuit for momentarily energizing said control relay comprising a circuit-control device located adjacent the pivotally mounted ends of the set of arms operated by the motor and operable by each pipe moving thereover; a "raise" signal circuit in parallel connection with said "lower" signal circuit comprising a time relay and a circuit-control device operable by a pipe on the longitudinal conveyor serviced by the set of elevating arms operated by the motor; a circuit-control device operable by one of the first set of arms when that set is moved to its lowered position, said last mentioned device being connected in circuit with the circuit-control device in the "lower" signal circuit of the motor which operates said first set of arms whereby said "lower" signal circuit is rendered inoperative when the first set of arms are in their lowered position; and a circuit-control device operable by one of the second set of arms when said second set is moved to its lowered position, said last mentioned device being connected in circuit in the "raise" signal circuit of the motor which operates the first mentioned set of arms whereby said "raise" circuit is rendered inoperative when the second set of arms are in their raised position.

5. In apparatus for transferring pipe and the like, a transverse conveyor; a first longitudinal conveyor located adjacent one end of and below said transverse conveyor; a second longitudinal conveyor disposed parallel to the first longitudinal conveyor and below said transverse conveyor; a first set of arms having ends pivotally mounted adjacent the end of said transverse conveyor and free ends formed to cradle a pipe, said set of arms being adapted to transfer a pipe between said transverse conveyor and said first longitudinal conveyor; a second set of arms pivotally mounted adjacent the first set and adapted to transfer a pipe between said transverse conveyor and said second longitudinal conveyor; a set of cross-over arms pivotally mounted adjacent the point of mounting of the second set of arms for bridging the gap between the end of the transverse conveyor and the pivotally mounted ends of the second set of arms; means connecting the free ends of the first set of arms to the crossover arms whereby the latter will be raised and lowered with the first set of arms; operating means for raising and lowering each set of arms, each of said means comprising cranks connected to said arms and an electric motor for driving said cranks; and control means for each of said motors, the control means including a motor control relay having two sets of contacts, one set of said contacts being connected in circuit with the motor; sealing-in means for maintaining said control relay closed for a half revolution of the cranks driven by the motor it controls, said sealing-in means including a circuit comprising the second set of contacts of the control relay and a normally open cam-operated switch, a cam for operating said switch and a 2:1 gearing means for driving said cam from the cranks driven by the motor whereby said cam will make a full revolution for each half revolution of the cranks; a "lower" signal circuit for momentarily energizing said second relay comprising a normally open switch located adjacent the pivotally mounted ends of the set of arms operated by the motor and operable by each pipe moving thereover; a "raise" signal circuit in parallel connection with said "lower" signal circuit comprising a time relay and a normally open switch operable by a pipe on the long conveyor serviced by the set of elevating arms operated by the motor for energizing said time relay; a normally closed switch operable by one of the first set of arms when that set is moved to its lowered position, said last mentioned switch being connected in series with the normally open switch in the "lower" signal circuit of the motor which operates said first set of arms whereby said "lower" signal circuit is rendered inoperative when the first set of arms are in their lowered position; and a normally open switch operable by one of the second set of arms when said second set is moved to its lowered position, said last mentioned switch being connected in circuit in the "raise" signal circuit of the motor which operates the first mentioned set of arms whereby said "raise" signal circuit is rendered inoperative when the second set of arms are in their raised position.

6. In apparatus for transferring pipe and the like, a transverse conveyor; a first longitudinal conveyor located adjacent one end of and below said transverse conveyor; a second longitudinal conveyor disposed parallel to the first longitudinal conveyor and below said transverse conveyor; a first set of arms having ends pivotally mounted adjacent the end of said transverse conveyor and free ends formed to cradle a pipe, said set of arms being adapted to transfer a pipe between said transverse conveyor and said first longitudinal conveyor; a second set of arms pivotally mounted adjacent the first set and adapted to transfer a pipe between said transverse conveyor and said second longitudinal conveyor; a set of cross-over arms pivotally mounted adjacent the point of mounting of the second set of arms for bridging the gap between the end of the transverse conveyor and the pivotally mounted ends of the second set of arms; linkage means connecting the free ends of the first set of arms to the cross-over arms whereby the latter will be raised and lowered with the first set of arms; operating means for raising and lowering each set of arms, each of said means comprising cranks connected to said arms and an electric motor for driving said cranks; and control means for each of said motors, the control means including a first normally open relay having two sets of contacts, one set of said contacts being connected in circuit with the motor; a second normally open relay for initiating the closing of said first relay; sealing-in means for maintaining said first relay closed for a half revolution of the cranks driven by the motor, said sealing-in means including a circuit comprising the second set of contacts of said first relay and a normally open cam-operated switch, a cam for operating said switch and a 2:1 gearing means for driving said cam from the cranks whereby said cam will make a full revolution for each half revolution of the cranks; a "lower" signal circuit for momentarily energizing said second relay comprising a normally open limit switch located adjacent the pivotally mounted ends of the set of arms operated by the motor and operable by each pipe moving thereover;

a "raise" signal circuit in parallel connection with said "lower" signal circuit to said second relay comprising a time relay and a normally open relay in series connection therewith and a normally open limit switch operable by a pipe on the long conveyor serviced by the set of arms operated by the motor for energizing said time relay; a normally closed limit switch operable by one of the first set of arms when that set is moved to its lowered position, said last mentioned switch being connected in series with the normally open limit switch in the "lower" signal circuit of the motor which operates said first set of arms whereby said "lower" signal circuit is rendered inoperative when the first set of arms are in their lowered position; and a normally open limit switch operable by one of the second set of arms when said second set is moved to its lowered position, said last mentioned switch being connected in circuit in the "raise" signal circuit of the motor which operates the first mentioned set of arms whereby said "raise" signal circuit is rendered inoperative when the second set of arms are in their raised position.

GEORGE J. KIRCHNER.

No references cited.